(12) United States Patent
Winkelsas et al.

(10) Patent No.: US 8,157,663 B1
(45) Date of Patent: Apr. 17, 2012

(54) HEAD ALIGNMENT TRAINER

(76) Inventors: Joseph Winkelsas, Williamsville, NY (US); Stephen Lynch, North Tonawanda, NY (US)

(*) Notice: Subject to any disclaimer, the term of this patent is extended or adjusted under 35 U.S.C. 154(b) by 0 days.

(21) Appl. No.: 13/102,601

(22) Filed: May 6, 2011

(51) Int. Cl.
*A63B 69/36* (2006.01)
*G02C 1/00* (2006.01)

(52) U.S. Cl. .......................... 473/210; 473/252; 351/158

(58) Field of Classification Search .................. 473/207, 473/208, 210, 211, 266, 268, 274; 351/41, 351/57, 158
See application file for complete search history.

(56) References Cited

U.S. PATENT DOCUMENTS

| | | | | |
|---|---|---|---|---|
| 1,851,579 A | * | 3/1932 | Hixon | 359/411 |
| 2,024,322 A | * | 12/1935 | Wittig | 359/411 |
| 4,097,141 A | | 6/1978 | Warner | |
| 4,155,626 A | | 5/1979 | Grech | |
| 4,364,645 A | * | 12/1982 | Feinbloom | 351/204 |
| 4,429,959 A | * | 2/1984 | Walters | 351/158 |
| 4,498,743 A | | 2/1985 | Feinbloom | |
| 4,531,743 A | | 7/1985 | Lott | |
| 4,834,525 A | * | 5/1989 | Vansaghi | 351/158 |
| 4,852,882 A | | 8/1989 | Otsuka et al. | |
| 5,291,229 A | * | 3/1994 | Feinbloom | 351/57 |
| 5,384,607 A | * | 1/1995 | Morris et al. | 351/158 |
| 5,444,501 A | | 8/1995 | Aloi et al. | |
| 5,499,064 A | * | 3/1996 | Vansaghi | 351/158 |
| 6,390,823 B1 | | 5/2002 | Wesenhagen | |
| 6,667,833 B1 | * | 12/2003 | Fay | 359/411 |
| 6,789,897 B2 | | 9/2004 | Smith | |
| 6,921,167 B2 | * | 7/2005 | Nagata | 351/158 |
| 7,600,871 B2 | * | 10/2009 | Lane et al. | 351/47 |

* cited by examiner

*Primary Examiner* — Nini Legesse
(74) *Attorney, Agent, or Firm* — Vincent G. LoTempio; Brendan S. Lillis; Kloss, Stenger & Lo Tempio

(57) ABSTRACT

A sports head alignment trainer comprised of a pair telescoping tubes mounted to a bridge or frame provided at its opposite ends with hinge elements to which are connected a pair of temple bars or arms. The telescoping tubes are two identical hollow adjustable multi-scopes each comprised of an inner scope and outer scope that can be selectively retracted or extended. The arms are configured to be placed on the user's head and maintain position by wrapping around a person's ears, like ordinary glasses. The telescoping tubes selectively limit the wearer's field of view thereby preventing the wearer from focusing on a target unless proper head alignment is maintained.

21 Claims, 5 Drawing Sheets

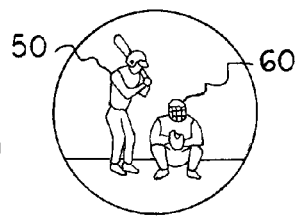
FIG. 5
FIG. 6
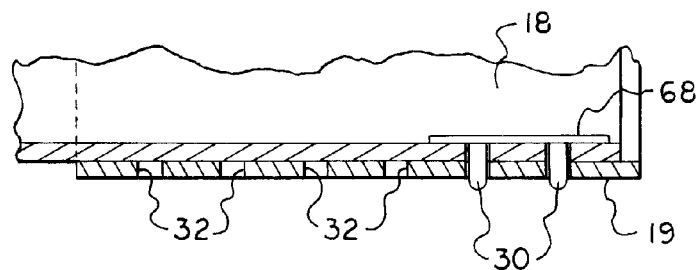
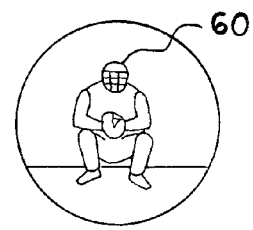
FIG. 10
FIG. 7
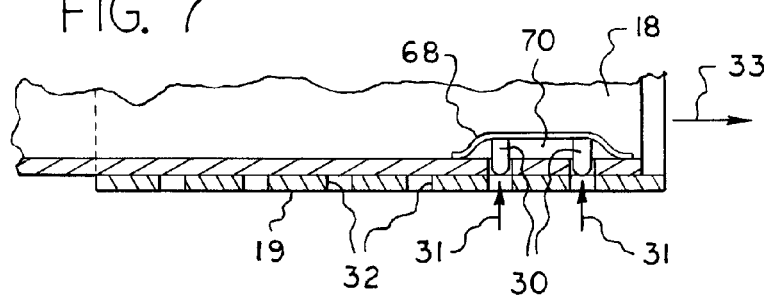
FIG. 8
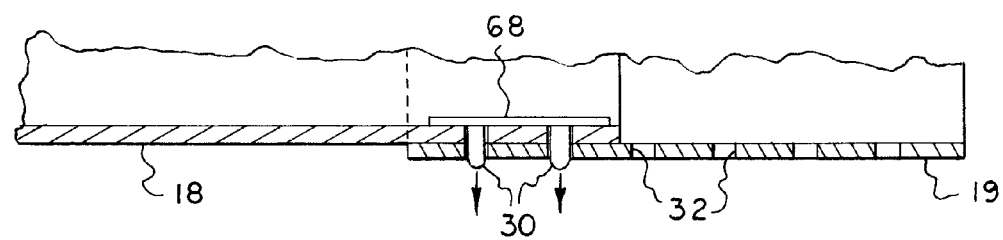
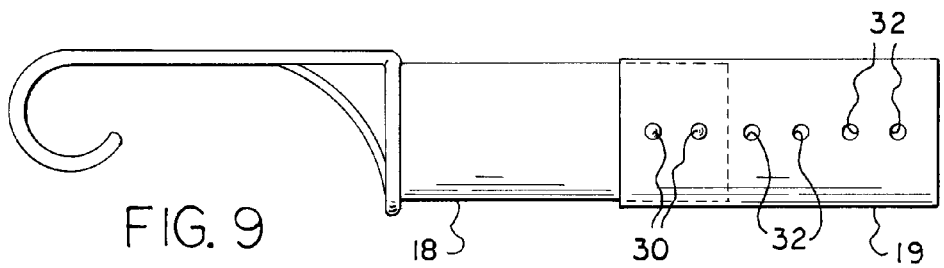
FIG. 9

HEAD ALIGNMENT TRAINER

BACKGROUND OF THE INVENTION

1. Field of the Invention

This disclosure generally relates to a head alignment trainer for an athlete. More particularly, the disclosure relates to a head alignment trainer device comprised of telescoping tubes mounted to an eyeglass frame for restricting the wearer's field of view.

2. Background

There are a number of sports related devices designed to improve an athlete's performance. In sports which require a repetitive motion, such as throwing a football or baseball or striking a golf ball, muscle memory plays an important role in the athlete's ability to produce quality actions consistently. There a number of devices which assist the development of muscle memory including straps or braces, vision manipulation devices, and external gadgetry, to name a few.

Several devices have been invented to facilitate keeping an athlete's vision directed to a selected target. For example U.S. Pat. No. 4,531,743 issued to Lott, discloses a golfer's aid consisting of a pair of glasses equipped with a sheet of material extended beyond the frame. The sheet of material is configured with slots and crosses to restrict the wearer's forward vision so that the wearer focuses on the desired target (i.e. the ball) when conducting a swing. This aid allows the golfer to monitor whether the head remains in a constant position during the swing or whether the golfer moves the head thereby losing sight of the ball. Although the device does limit forward vision, there is no consideration to eliminating distractions from peripheral vision. Additionally, the proximate placement of the apertures requires the eyes to focus to a central point relatively close to the wearer (i.e. a matter of feet). Beyond this distance, the apertures no longer restrict the field of vision to a narrow field (i.e. less than 2 foot diameter view).

Another example is U.S. Pat. No. 4,852,882 issued to Otsuka, et al., which discloses a golfing aid device which restricts peripheral vision and forces the golfer to view the ball through vision constricted apertures. The device is strapped to the head and possesses a tiltable body which assists the golfer in locating and focusing on the ball depending on the environs in which the ball is located (i.e. on a hill or in the fairway). The golfer can then swing at the ball while holding his head still. This patent discloses a device which restricts peripheral vision while also constricting forward vision. However, the apertures are located proximate the wearer's eyes and project outwardly in what appears to be a roughly parallel plane that does not narrowly restrict the athlete's view specifically to the target.

Still another example is U.S. Pat. No. 5,444,501 issued to Aloi, et al, which discloses a golfing aid which comprises a pair of spectacles to assist the golfer in sighting the ball during a swing. The device consists of a frame having a pair of lenses wherein each lens allows only 1.5 percent of light to pass through the lens. Depending on the handedness of the golfer, the opposite handed lens has a small aperture through with the golfer sees the ball and maintains his head position through the swing. The problem with the invention described in this patent is that it does not provide for any restriction to a wearer's peripheral vision. Thus, although the wearer can focus forward, there are still distractions due to peripheral vision.

U.S. Pat. No. 6,390,823 describes a golf aid having a telescoping lens which is positioned in front of the wearer's eyes. The aid is comprised of two telescoping arms between which is positioned a single lens. The lens is generally doughnut-shaped and the wearer's view is directed through the doughnut hole. Although telescoping, this device suffers a number of significant drawbacks. First, peripheral vision is not impeded and the wearer can be subject to distractions. Secondly, the lens has a single aperture which creates a monoscopic, two-dimensional view of the ball. When viewing objects at a distance (such as a catcher's mitt as envisioned in the present disclosure), depth perception is of utmost importance. Therefore, an image should be three-dimensional, thereby requiring a binocular lens arrangement.

Thus it is readily apparent that there is a need of a head alignment trainer specially designed to selectively limit the wearer's field of view by eliminating any peripheral vision thereby allowing the wearer to focus on a target and create muscle memory by consistently maintaining head position while training for a variety of different sports activities.

SUMMARY OF THE INVENTION

It is accordingly a primary object of the present disclosure to provide a head alignment trainer wherein an eyeglass frame is equipped with telescoping tubes which extend outwardly from the frame.

Another object of the disclosure is to provide a head alignment trainer having tapered, telescopic tubes to permit the wearer to changeably create a singular, relatively small, focused field a vision at a distance (from a few feet to many yards) from the wearer.

Yet another object of the disclosure is to provide head alignment trainer having apertures located distal the wearer's eyes and employing a telescopically manipulated, non-parallel viewing plane thereby ensuring that the wearer views a single, focused image with both eyes rather that a separate image for each eye.

A further object of the disclosure is to provide a head alignment trainer with telescoping tubes that selectively limit the wearer's field of view by eliminating any peripheral vision thereby allowing the wearer to focus on a target (i.e. a pitcher focusing on a catcher's mitt; shooting a basketball, or reading, to name a few) while minimizing distractions.

Another further object of the disclosure is to provide a head alignment trainer with telescoping tubes that do not possess any lenses.

A further object of the disclosure is to provide a head alignment trainer with telescoping tubes that contain lenses such as prescription lenses or sunglass lenses.

This disclosure is directed towards a head alignment trainer that may be worn in the manner of eyeglasses. The head alignment trainer device is comprised of a pair telescoping tubes mounted to a bridge or frame provided at its opposite ends with hinge elements to which are connected a pair of temple bars or arms. The telescoping tubes are two identical hollow adjustable multi-scopes each comprised of an inner scope and outer scope that can be selectively retracted or extended. The arms are configured to be placed on the user's head and maintain position by wrapping around a person's ears, like ordinary glasses. The ends of the arms are shaped so as to hook around and under the ear.

Additional objects and advantages will become apparent and a more thorough and comprehensive understanding may be had from the following description and claims taken in conjunction with the accompanying drawings forming a part of this specification.

BRIEF DESCRIPTION OF THE DRAWINGS

The present disclosure and the manner in which it may be practiced is further illustrated with reference to the accompanying drawings wherein:

FIG. 5 is an illustration of a typical view of a pitcher on the mound of a baseball diamond looking through the head alignment trainer with the outer scopes in a retracted position.

FIG. 6 is a cross-sectional view of the head alignment trainer of the present disclosure, taken generally along line 6-6 in FIG. 4 showing the locking members.

FIG. 7 is a cross-sectional view of the head alignment trainer of the present disclosure in an unlatched position, taken generally along line 6-6 in FIG. 4.

FIG. 8 is a cross-sectional view of the head alignment trainer of the present disclosure with each scope in a fully extended position, taken generally along line 6-6 in FIG. 4.

FIG. 9 is a side view of the head alignment trainer of the present disclosure showing the outer scope in a fully extended position.

FIG. 10 is an illustration of a typical view of a pitcher on the mound of a baseball diamond looking through the head alignment trainer with the outer scopes in an extended position.

DETAILED DESCRIPTION OF THE INVENTION

Figure 1:
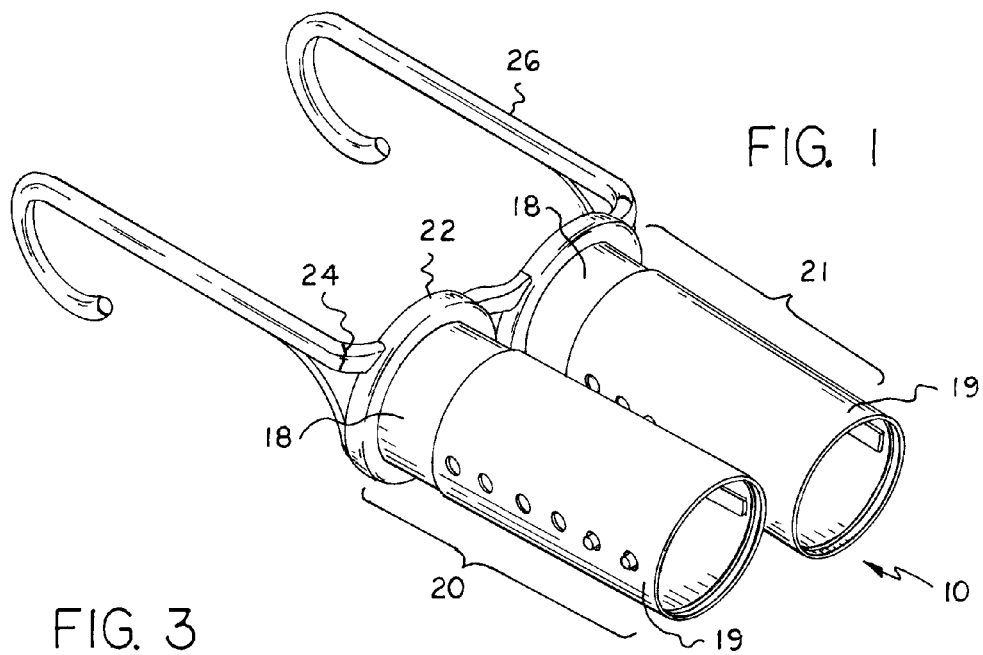
FIG. 1 is a perspective view of the head alignment trainer of the present disclosure showing the telescoping tubes in a retracted position.

At the outset, it should be clearly understood that like reference numerals are intended to identify the same structural elements, portions, or surfaces consistently through out the several drawing figures, as may be further described or explained by the entire written specification of which this detailed description is an integral part. The drawings are intended to be read together with the specification and are to be construed as a portion of the entire "written description" of this disclosure as required by 35 U.S.C. §112.

There are a number of sports related devices designed to improve an athlete's performance. In sports which require a repetitive motion, such as throwing a football or baseball or striking a golf ball, muscle memory plays an important role in the athlete's ability to produce quality actions consistently.

The present disclosure provides a head alignment trainer wherein an eyeglass frame is equipped telescoping tubes that extend outwardly from the frame that may be worn in the manner of eyeglasses. The head alignment trainer device is comprised of a pair telescoping tubes mounted to a bridge or frame provided at its opposite ends with hinge elements to which are connected a pair of temple bars or arms. The telescoping tubes are two identical hollow adjustable multi-scopes each comprised of an inner scope and outer scope that can be selectively retracted or extended. The arms are configured to be placed on the user's head and maintain position by wrapping around a person's ears, like ordinary glasses. The ends of the arms are shaped so as to hook around and under the ears. The telescoping tubes selectively limit the wearer's field of vision by eliminating any peripheral vision thereby allowing the wearer to focus on a target (i.e. a pitcher focusing on a catcher's mitt, a golfer focusing on the golf ball during a swing) while minimizing distractions.

It is the goal of an athlete to maintain position of the athlete's head during the delivery of a shot, throw or swing. It is not uncommon for an athlete's head to be inadvertently directed away from the target during a shot, causing the athlete to make an off balanced or rushed shot. As a result of this inadvertent head movement an athlete practices bad mechanics and reinforces a negative muscle memory. The head alignment device of the present invention allows the user to practice the correct mechanics and develop a positive muscle memory. Generally, an athlete's head is misdirected when an athlete's eyes inadvertently focuses on something other than the target. By eliminating the peripheral vision, the only way an athlete can maintain eye contact with the target is by keeping the athlete's head pointed at the target during the delivery of the throw. Thus for example, the only way a pitcher, wearing the head alignment device of the instant disclosure, can see the target (a catcher's mitt) throughout the throwing motion is to maintain proper head alignment.

A similar error experienced by golfers is turning of the head during a swing. By not focusing on the ball during a swing, the golfer risks striking a poor stroke. The head alignment device of the instant disclosure aids the golfer in maintaining head position to develop the muscle memory necessary to strike consistent swings. The head alignment device of the instant disclosure is not meant to be used during the actual games in which an athlete participates, but rather as a training device used during practice to develop muscle memory.

The above scenarios are merely illustrative examples and are not meant to limit the applicability of the device of the present disclosure. Indeed, it is envisioned that the present device can be utilized in any suitable situation where telescoping tubes are needed to eliminate distractions from the wearer's peripheral vision and adjustably restrict the field of view such that the target is isolated.

Adverting now to the drawings, with reference to FIG. 1, a perspective view of a preferred embodiment of the present disclosure of a head alignment device that may be worn in the manner of eyeglasses is indicated generally by numeral 10. The head alignment device is comprised of a pair telescoping tubes 20 and 21 mounted to a bridge or frame 22 provided at its opposite ends with hinge elements 24 to which are connected a pair of temple bars or arms 26. The telescoping tubes are two identical hollow length adjustable multi-scopes each comprised of inner scope 18 and outer scope 19. FIG. 1 is an illustration of a first embodiment of the invention depicting a pair of telescoping tubes 20 and 21 in a retracted position. It should be understood that the telescoping tubes 20 and 21 of the preferred embodiment are identical. Therefore, except as noted, the following description of telescoping tube 20 applies to both telescoping tubes 20 and 21.

Figure 13:
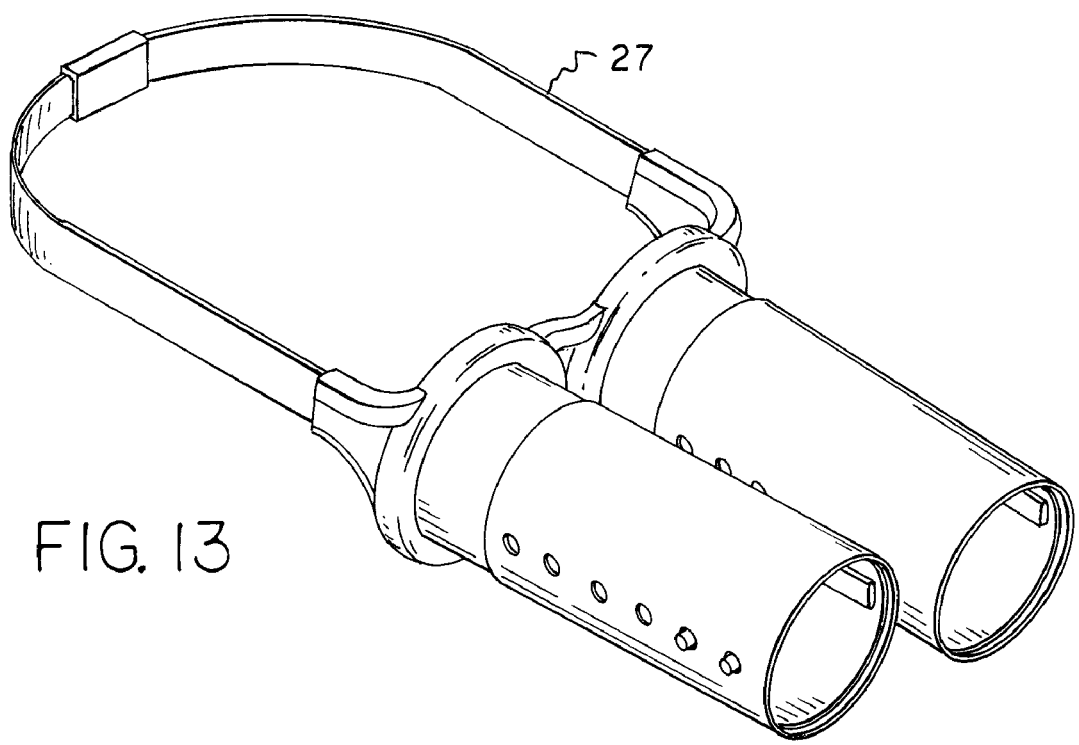
FIG. 13 is a perspective view of another embodiment of the head alignment trainer of the present disclosure attached to a headband.

In accordance with this preferred mode of practicing the invention, the bridge and bars are made of a suitable strong light weight material such as a plastic, rubber or metal. The arms are configured to be placed on the user's head and maintain position by wrapping around a person's ears, like ordinary glasses. However, because this is a head alignment trainer which needs to be held firmly to the head during the course of strenuous activity, the end of the arms 26 are shaped so as to hook around and under the ears and are configured from flexible rubber or plastic coated flexible wire. Alternatively, as shown in FIG. 13, the device is secured to the wearer's head by a band 27 affixed to the ends of the frame. In a preferred embodiment the present disclosure band 27 is made of an elastic material. A further alternative has a band affixed to the ends of the arms. In either embodiment, the band wraps around the back side of the head thereby snuggly securing the device to the head. It should be appreciated that other suitable materials, other than elastic material can be used in the manufacture of band 27 such as flexible cloth, string, rubber and a cloth material with hook and loop fasteners.

Frame 22 is attached to two like depending telescoping tubes 20 and 21 that resemble binoculars. The telescoping tubes are preferably configured as seven inch telescoping tubes, one for each eye. The telescoping tubes can be extended or retracted, independent of each other. Each of the telescoping tubes eliminates the peripheral vision of the wearer of head alignment trainer 10. Also, although not shown, the frame may be provided with a pair of nose-engaging members for supporting the frame on the wearer's nose, as in a conventional pair of spectacles. In addition, head alignment trainer 10 may be tailored to the characteristics of the wearer so that they are made in different sizes from small to extra large. Although, in a preferred embodiment, each telescoping tube is not equipped with any sort of lens, further embodiments envision each telescoping tube equipped with lenses such as prescription lenses or sunglass lenses.

Figure 2:
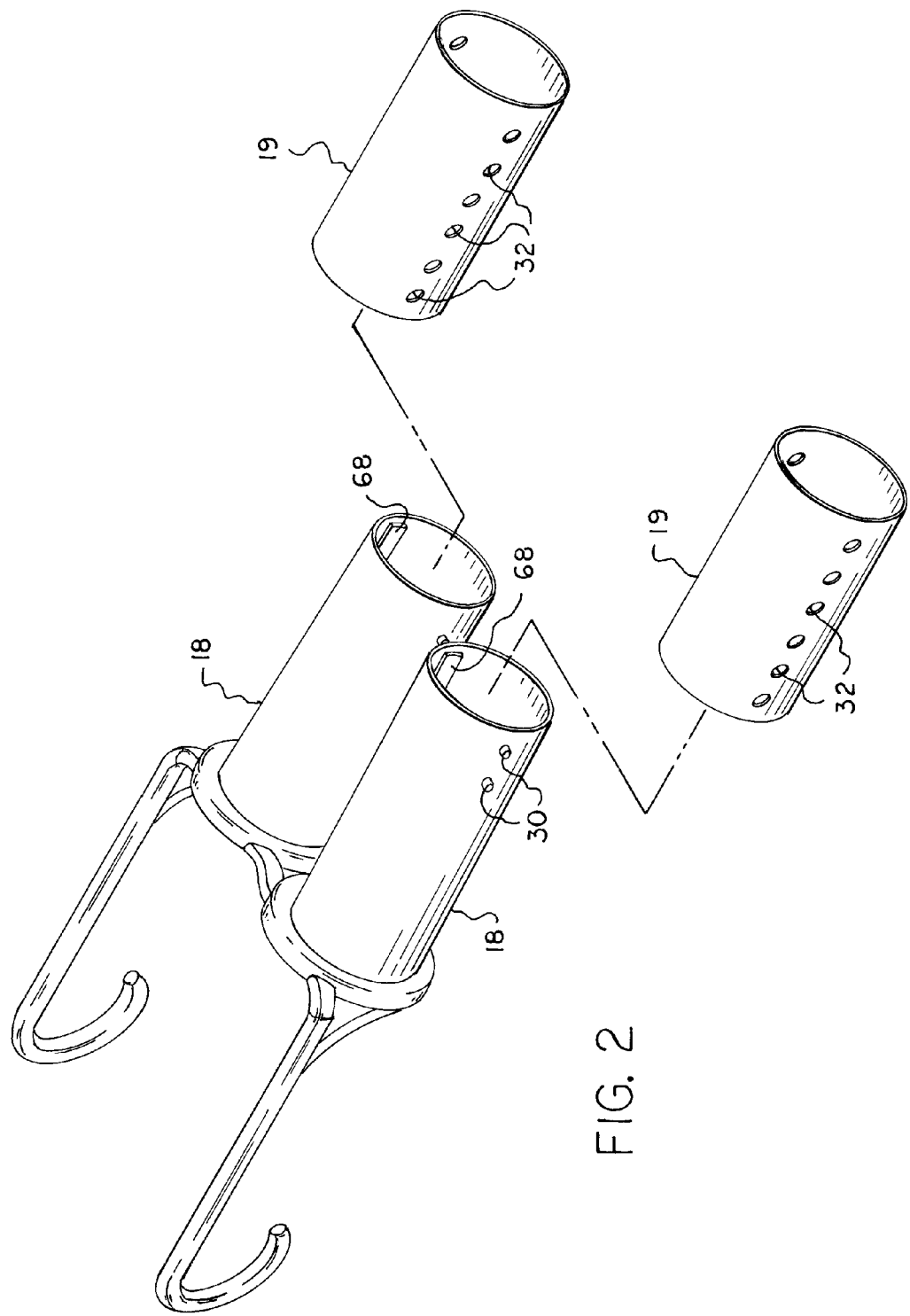
FIG. 2 is an exploded view of the head alignment trainer of the present disclosure.

FIG. 2 is an exploded view of the present disclosure. The telescoping tubes are two identical hollow multi-scopes each comprised of inner scope 18 and outer scope 19. So as to allow for the extension and retraction of the telescoping tubes at least one scope is configured with a radius smaller than the other scope, so that an inner scope can slide inside an outer t scope. In the preferred embodiment outer scope 19 has a larger radius so that when engaged with inner scope 18 the outer scope will surround a portion of inner scope 18. Inner scope 18 is configured with studs 30 that mate with a series of holes 32 in outer scope 19 and act as a retractable lock for the telescoping tubes. By configuring outer scope 19 to extend and retract over the top of inner scope 18 the movable outer scope is less likely to be pushed into the eyes or face of the user. If the inner scope were configured to slide and move the frame of the device would not be positioned to prevent the movable scope from contacting the user. Although other materials could be used, in the embodiment illustrated, head alignment trainer 10 is constructed entirely of plastic material. Inner scope 18 can be mounted on frame 22 in any suitable manner. As shown in FIG. 2, one end of inner scope 18 is mounted on frame 22. Each inner scope 18 may be retained in place in the frame 22 by an adhesive or other suitable means such as an injection molded solitary unit.

Figure 3:
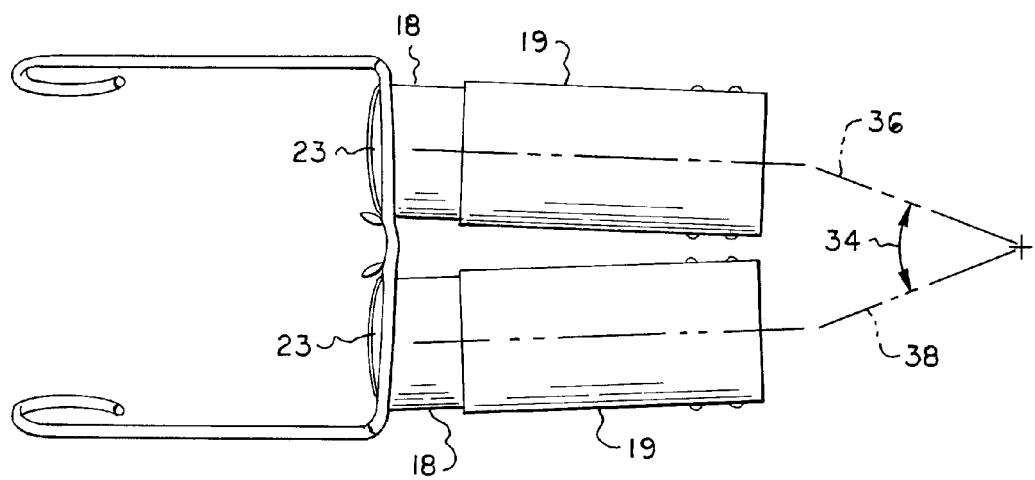
FIG. 3 is a top view of the head alignment trainer of the present disclosure illustrating the slight inward angle of the tubes.

FIG. 3 is a top view of a preferred embodiment of the head alignment trainer of the present disclosure illustrating the slight inward angle of telescoping tubes 20 and 21. The telescoping tubes are two identical hollow adjustable multi-scopes each comprised of inner scope 18 and outer scope 19. Inner scope 18 of each of the telescoping tubes is mounted on frame 22. The frame is angled inward so that both of the entire telescoping tubes are slightly angled towards each other (as shown by arrow 34) without making contact with each other. The angling of the tubes provides for one field of vision as shown in FIGS. 5 and 10. In the preferred embodiment depicted in FIG. 3 the tubes are configured to extend or retract at independent lengths. In an alternative embodiment, the device is configured like a pair of glasses wherein the user views the target through lenses 23. Lines 36 and 38 depict the line of sight of each telescopic tube provides relative to each other. In this illustration is readily apparent that the line of sight of each telescopic tube eventually merges to a common center point.

The length of tubes 20 and 21 can be adjusted by extending or retracting outer scope 19, which allows the user to regulate how much of the target the user is able to see. By angling the tubes at a common center point the user sees the target within a generally singular circular view, even though there are two separate circular openings. If the telescoping tubes were parallel to each other the user would essentially see two separate circular targets. By angling the telescoping tubes at a common center point, the end result is a single circular view as shown in FIGS. 5 and 10.

Figure 4:
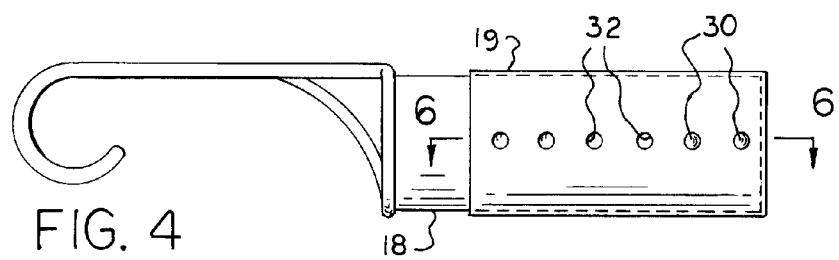
FIG. 4 is a side view of the head alignment trainer of the present disclosure with the outer scopes in a retracted position.

FIG. 4 is a side view of the present disclosure with the outer scopes in a retracted position. The two scope sections 18 and 19 are in their latched condition: that is, they cannot be moved longitudinally with respect to each other. The latching is accomplished by studs 30 which are forced into a seated position in holes 32 due to the force applied thereto by a flexible inside wall surface 68 (as seen in FIG. 6) of inner scope 18. Since studs 30 are forced into holes 32, it is not possible to move outer scope 19 in a longitudinal direction relative to inner scope 18. When the outer scope is in a retracted position and head alignment trainer 10 is placed on the head of a user, the user will have an a wider field of view relative to a view through a head alignment trainer having the outer scope in an extended position. It should be appreciated that other suitable materials, other than a flexible inside wall surface 68 can be used in the manufacture of means for moving studs 30 into holes 32 such as a spring-loaded mechanism.

FIG. 5 is an illustration of a typical view of a pitcher on the mound of a baseball diamond looking through the head alignment trainer with the outer scopes in a retracted position When the outer scope is in a retracted position, as shown in FIG. 3, and head alignment trainer 10 is placed on the head of a user, the user will have an expanded view as compared to a view through the device having outer scope 19 retracted as shown in FIGS. 8 and 9. For example, if the user of head alignment trainer 10 having outer scope 19 in a fully retracted position were on the pitcher's mound of a baseball diamond, all peripheral vision of the first and third base would be eliminated and the user's field of sight would be limited to batter 50 and catcher 60. Although the use of the present device has been illustrated using a pitcher/catcher scenario, it is envisioned that the device is suitable for additional uses such as golf, football, basketball, or other training purposes.

FIG. 6 is a cross-sectional view of the head alignment trainer of the present disclosure, taken generally along line 6-6 in FIG. 4 showing locking members or studs 30 engaged with holes 32 in a locked retracted position. The two scope sections 18 and 19 are in their latched condition: that is, they cannot be moved longitudinally with respect to each other. The latching is accomplished by studs 30 which are forced into a seated position in holes 32 due to the force applied thereto by inside wall surface 68 of inner scope 18. Since studs 30 are forced into holes 32, it is not possible to move outer scope 19 in a longitudinal direction relative to inner scope 18.

FIG. 7 is a cross-sectional view of the head alignment trainer of the present disclosure, taken generally along line 6-6 in FIG. 4 showing the unseating of studs 30 from holes 32 by applying external perpendicular pressure on studs 30 as depicted by arrows 31, thereby allowing outer scope 19 to move in a longitudinal direction relative to inner scope 18. The applied pressure creates a space 70 formed in the inside wall of the inner scope thereby unseating studs 30 from holes 32 resulting in unlatched scope sections. Once the studs have been unseated, the outer section 19 can be longitudinally extended or retracted relative to inner section 18. As illustrated in FIG. 7, outer section 19 is extended from inner section 18 as shown by arrow 33. When the outer section is longitudinally moved, studs 30 are unseated and moved upwardly through hole 32. As long as the user maintains pressure on studs 30 so as to maintain space 70, the outer scope can be moved longitudinally and any of its serially arranged holes can pass over studs 30. Therefore, to reach the desired scope length, outer scope section is positioned so that the selected holes are above studs 30 and the pressure on studs 30 is released.

FIG. 8 is a cross-sectional view of the head alignment trainer of the present disclosure with each scope in a fully extended position, taken generally along line 6-6 in FIG. 4 showing the studs engaged with the holes. The two scope sections 18 and 19 are in their latched condition: that is, they cannot be moved longitudinally with respect to each other. The latching is accomplished by studs 30 which are forced into a seated position in holes 32 due to the force applied thereto by inside wall surface 68 of inner scope 18. Since studs 30 are forced into holes 32, it is not possible to move outer scope 19 in a longitudinal direction relative to inner scope 18.

FIG. 9 is a side view of the present disclosure showing outer scope 19 in a fully extended position. Outer scope 19 has been moved in a longitudinal direction relative to inner scope 18 and studs 30 of inner scope 18 are engaged with the last two holes 32 in outer scope 19.

FIG. 10 is an illustration of a typical view of a pitcher on the mound of a baseball diamond looking through the head alignment trainer with the outer scopes in an extended position as shown in FIGS. 8 and 9. When the outer scope is in an extended position and head alignment trainer 10 is placed on the head of a user, the user will have a more contracted field of view as compared to a view through the device having outer scope 19 retracted as shown in FIG. 3. For example, if the user of head alignment trainer 10 having outer scope 19 in a fully extended position were on the pitcher's mound of a baseball diamond, all peripheral vision of the first and third base would be eliminated and the user would only be able see catcher 60. This baseball example above is for illustrative purposes only and it should be understood that an athlete can use the head alignment device of the instant disclosure to focus on any extremely small target such as a catcher's mitt or a basketball hoop for example.

Figure 11:
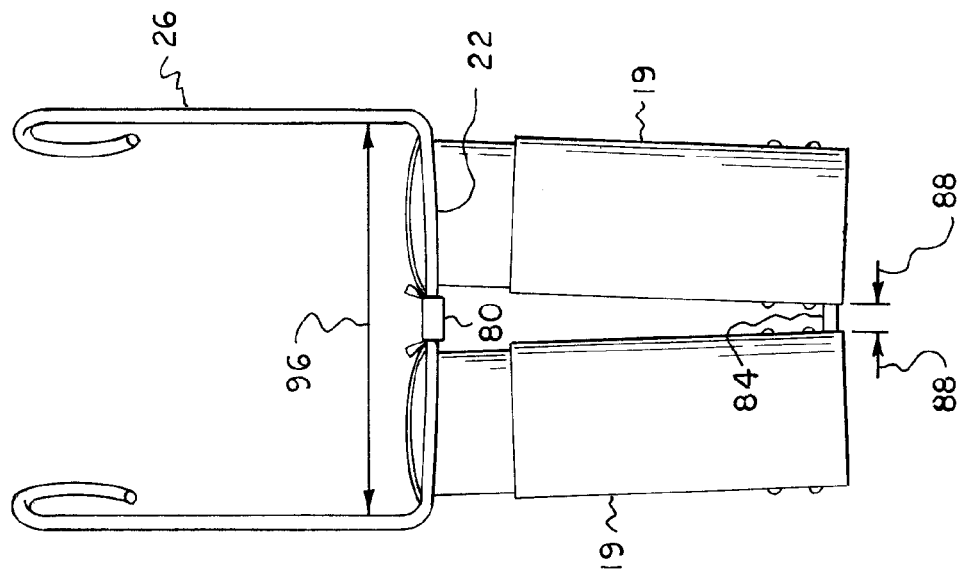
FIG. 11 is a top view of another embodiment of the head alignment trainer of the present disclosure illustrating the adjustable frame of the device.

FIG. 11 is a top view of the head alignment trainer of another embodiment of the present disclosure illustrating the adjustable frame and tubes of the device. The telescoping tubes are mounted on an adjustable frame 22 configured with means for adjustment 80 so that the ends of tubes proximate frame 22 are moved toward each other and the distance between arms 26 is decreased as shown by arrow 96. The telescoping tubes angle in towards each other without making contact with each other and the distance between the ends of outer scopes 19 distal to the frame is maintained by means for orientation 84. The adjustable distance between the ends of the telescoping tubes is shown in FIG. 11 by arrows 88. The frame is angled inward so that both of the entire telescoping tubes are slightly angled towards each other without making contact with each other. The angling of the tubes provides for one field of vision as shown in FIGS. 5 and 10. The adjustment means allows the user to adjust the angle and distance between the telescoping tubes and therefore changeably create a singular, relatively small, focused field a view at a distance (from a few feet to many yards) from the wearer.

Figure 12:
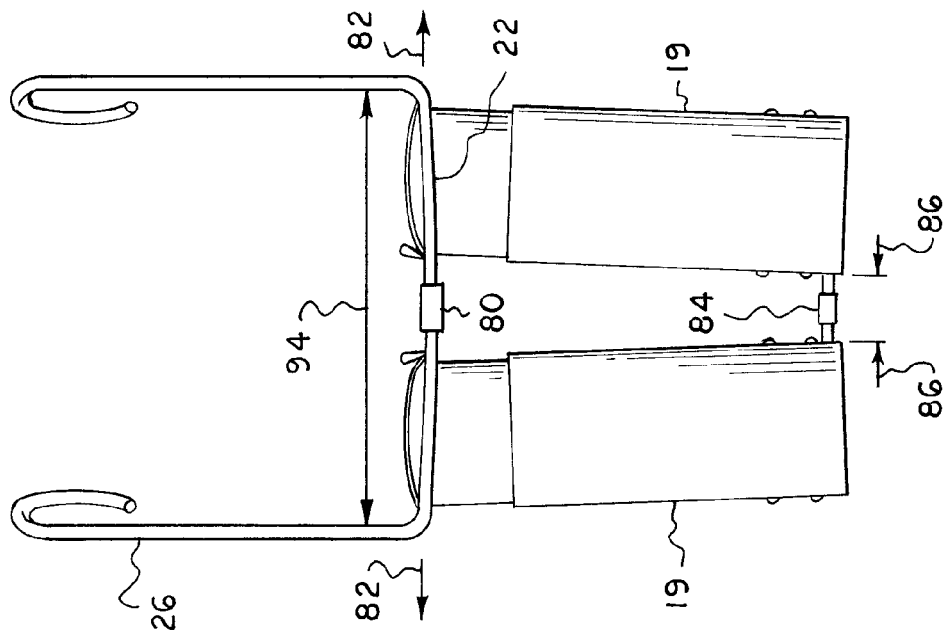
FIG. 12 is a top view of the head alignment trainer of the present disclosure illustrating the adjustable frame of the device.

FIG. 12 is a top view of the head alignment trainer of a first alternate embodiment of the present disclosure illustrating the adjustable frame and tubes of the device. The telescoping tubes are mounted on an adjustable frame 22 configured with means for adjustment 80 so that the ends of tubes proximate frame 22 can be moved away from each other as shown by arrows 82 and the distance between arms 26 is increased as shown by arrow 94. Examples of means for adjustment 80 in this preferred embodiment include clips with jagged matching edges, hinge, post and tube, sliding dovetail, threaded fastener, threaded dowel, threaded coupling and the like. The telescoping tubes angle in towards each other without making contact with each other and the distance between the ends of outer scopes 19 distal to the frame is maintained by means for orientation 84. Examples of means for orientation 84 in this preferred embodiment include clips with jagged matching edges, hinge, post and tube, sliding dovetail, threaded fastener, threaded dowel, threaded coupling and the like. The distance between the ends of the telescoping tubes is shown in FIG. 12 by arrows 86. The angling of the telescoping tubes and base will provide for one field of view. The user adjusts and maintains the angle and distance between the telescoping tubes with the means for orientation so that when viewing target the telescoping tubes create one field of view as illustrated in FIGS. 5 and 10. It should be readily understood that the angle and distance of the telescoping tubes relative to each other (and the user's distance from the target) will dictate the device's ability to create one field of view. By angling the tubes at a common center point the user sees the target within a singular circular view, even though there are two separate circular openings. If the telescoping tubes were parallel to each other the user would essentially see two separate circular targets. By angling the telescoping tubes at a common center point the end result is a single circular view as shown in FIGS. 5 and 10.

Although the disclosure as been described with reference to certain preferred embodiments, it will be appreciated by those skilled in the art that modifications and variations may be made without departing from the spirit and scope of the disclosure. It should be understood that applicant does not intend to be limited to the particular details described above and illustrated in the accompanying drawings. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

The invention claimed is:

1. A head alignment trainer device which comprises:
a frame having at least one lens opening;
a means for securing said frame on a user;
at least one telescoping tube mounted to said frame proximate said at least one lens opening and arranged to restrict the users field of view to produce a general single circular field of view, wherein said telescoping tube has an outer scope longitudinally extendable/retractable about an inner scope; and wherein the telescoping tubes selectively limit the wearer's field of view thereby preventing the wearer from focusing on a target unless proper head alignment is maintained.

2. The head alignment trainer device of claim 1 wherein said at least one hollow tube is a pair of telescoping tubes arranged in a non-parallel viewing plane to produce a general single circular field of view for the user.

3. The head alignment trainer device of claim 1 wherein said frame is an eyeglass frame.

4. The head alignment trainer device of claim 1 wherein said frame is a goggle frame.

5. The head alignment trainer device of claim 1 wherein said means for securing said frame on a user is a pair of temple bars.

6. The head alignment trainer device of claim 2 wherein said pair of telescoping tubes each have an inner scope and an extendable or retractable outer scope for selectively adjusting the users field of view.

7. The head alignment trainer device of claim 4 wherein said means for securing said frame on a user is an elastic band.

8. The head alignment trainer device of claim 5 wherein each of said temple bars are configured to be wrapped around a user's ears.

9. The head alignment trainer device of claim 5 further comprising a band connecting each of said temples bars.

10. The head alignment trainer device of claim 1 further comprising at least one lens mounted within said at least one hollow tube.

11. The head alignment trainer device of claim 10 wherein said at least one lens is a sunglass lens.

12. The head alignment trainer device of claim 1 wherein said frame is configured with a means for adjustment.

13. The head alignment trainer device of claim 12 wherein said means for adjustment is an expanding clip.

14. The head alignment trainer device of claim 2 wherein a means of orientation is mounted to said pair of telescoping tubes distal to said frame for selectively adjusting said non-parallel viewing plane.

15. The head alignment trainer device of claim 14 wherein said means for orientation is a threaded coupling.

16. A head alignment trainer device which comprises:
an eyeglasses frame having a pair of lens openings and two temple bars, wherein said frame is configured with an expanding clip for adjustment;
a pair of telescoping tubes mounted to said frame for selectively varying the field of view of the user and arranged in a non-parallel viewing plane; and wherein the telescoping tubes selectively limit the wearer's field of view thereby preventing the wearer from focusing on a target unless proper head alignment is maintained to produce a generally single circular field of view for the user wherein a threaded coupling is mounted to said pair of telescoping tubes distal to said frame for selectively adjusting said non-parallel viewing plane.

17. The head alignment trainer device of claim 16 wherein said pair of telescoping tubes are arranged in a non-parallel viewing plane to produce a generally single circular field of view for the user.

18. The head alignment trainer device of claim 17 wherein said frame is configured with a means for adjustment.

19. The head alignment trainer device of claim 18 wherein a means of orientation is mounted to said pair of telescoping tubes distal to said frame for selectively adjusting said non-parallel viewing plane.

20. The head alignment trainer device of claim 19 wherein said means for adjustment is an expanding clip and wherein said means of orientation is a threaded coupling.

21. The head alignment trainer device of claim 1 wherein said outer scope is longitudinally extendable/retractable about an inner scope means and is releasably secured by at least one locking stub on said inner scope which selectively engages with at least one corresponding hole on said outer scope.

* * * * *